Jan. 26, 1937.  M. E. GLEICK  2,068,795
APPARATUS FOR INCREASING THE INTENSITY OF FLAMING ARCS
Filed June 24, 1936  2 Sheets-Sheet 1
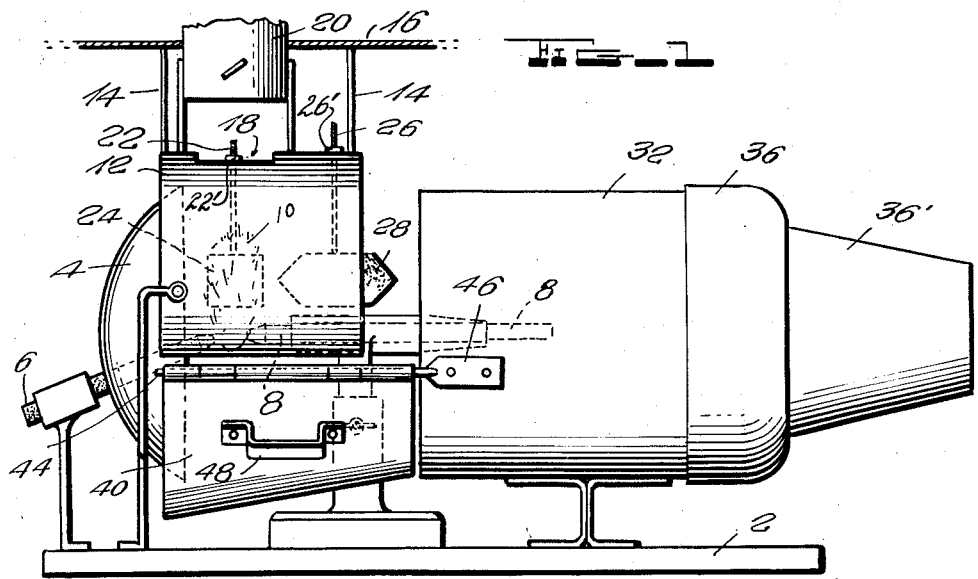
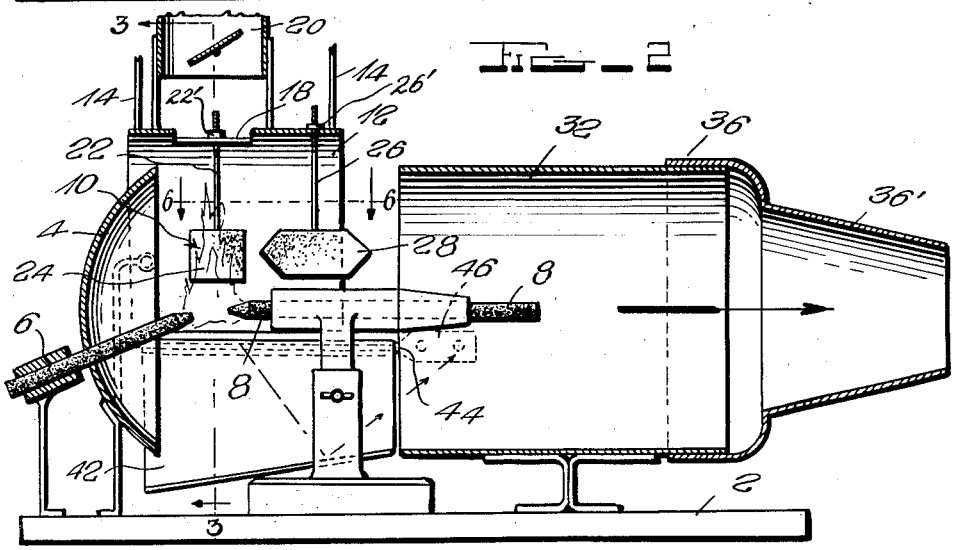
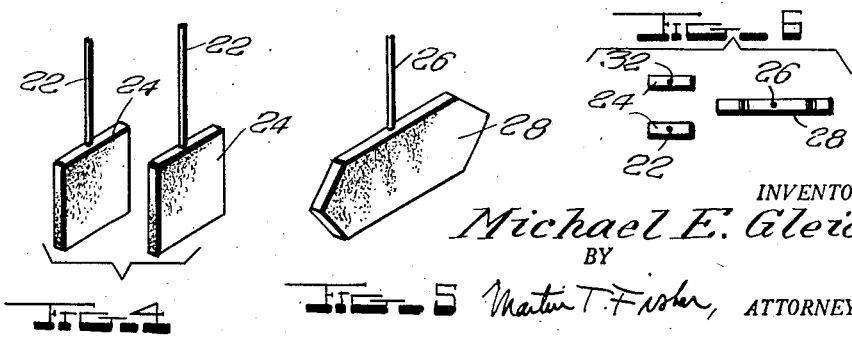
INVENTOR.
Michael E. Gleick,
BY
Martin T. Fisher, ATTORNEY.

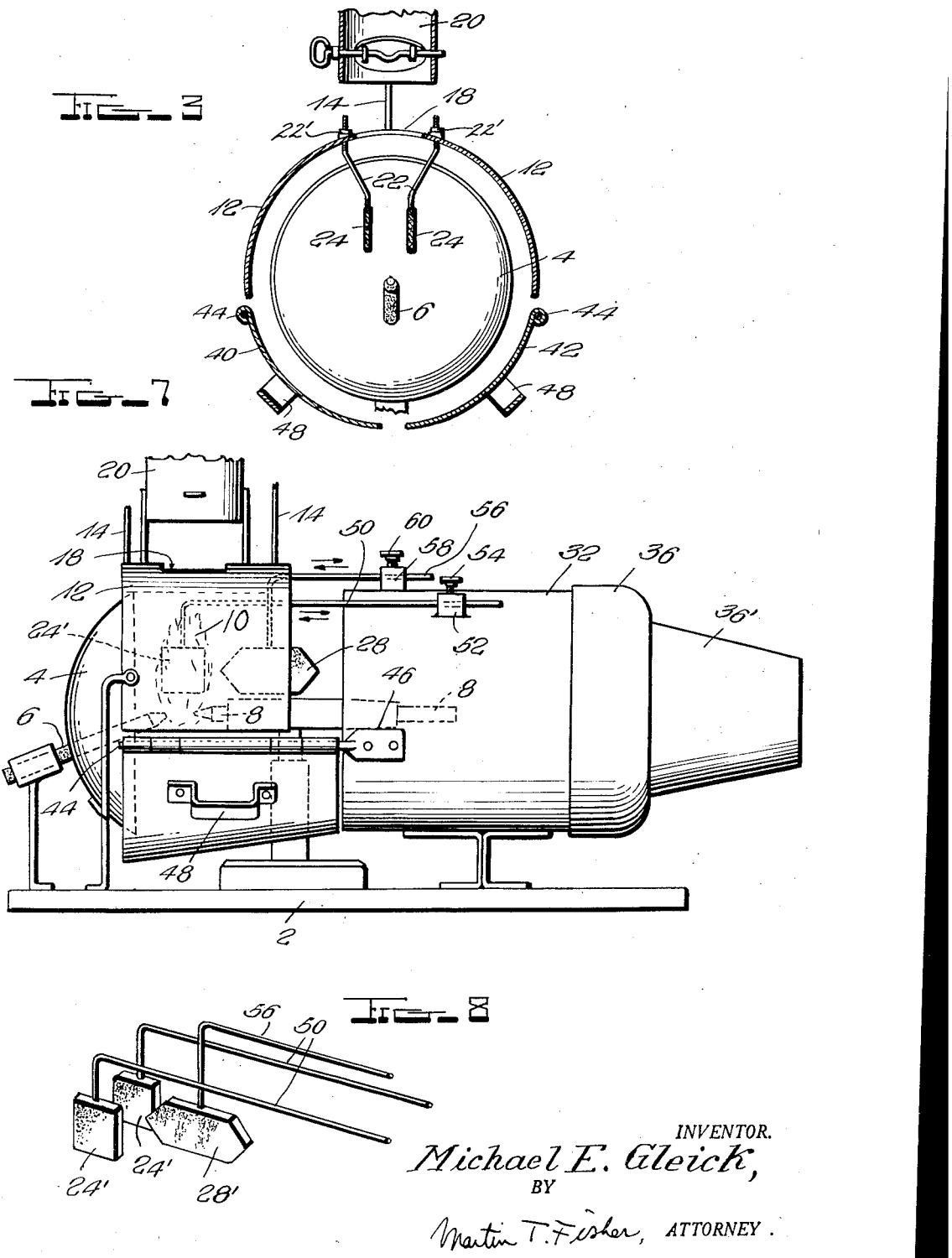

Patented Jan. 26, 1937

2,068,795

UNITED STATES PATENT OFFICE 2,068,795

APPARATUS FOR INCREASING THE INTENSITY OF FLAMING ARCS

Michael Edward Gleick, Archbald, Pa.

Application June 24, 1936, Serial No. 87,031

11 Claims. (Cl. 176—51)

This invention relates to improvements in connection with arc lights, particularly with the flaming arc used in motion picture projection work.

The invention comprises various accessories to be used in connection with the flaming arc, for increasing the intensity and the amount of light available for projection.

The invention comprises the following features:

1. Plates of suitable shape placed on either side of the flaming arc, fairly close to the tail flame. These plates, in addition to aiding in the reflection of light, also serve to prevent wavering of the tail flame.

2. A disc or plate of suitable shape placed directly in front of the tail flame.

3. A substantially cylindrical reflector member, the inside of which is polished, for guiding the light rays toward the film aperture.

4. Reflector member shaped like the segment of a cone, arranged below the arc for guiding light rays into the cylindrical reflector member.

5. A curved reflector member placed over the flaming arc.

Actual tests with a motion picture projector employing the above noted accessories have shown an increase in the intensity of light of the order of 20 or 25% with a given amount of power or, to put the matter in another way, a projection apparatus using the features of this invention gives the same amount of light as the ordinary projector, but with 20% less power.

The main features of the invention having been thus outlined, the invention will now be described in connection with the accompanying drawings illustrating the present preferred embodiments of the invention.

In these drawings:

Fig. 1 is a side view of a motion picture projection apparatus employing the features of the present invention;

Fig. 2 is a longitudinal vertical section through Fig. 1;

Fig. 3 is a transverse cross section on the line 3—3 of Fig. 2;

Figs. 4 and 5 are enlarged, perspective views of the plates mounted near the tail flame;

Fig. 6 is a plan view of the same plates;

Fig. 7 is a side view of a modification; and

Fig. 8 is a perspective view showing a detail of Fig. 7.

Referring now to these drawings, in which similar reference characters indicate similar parts, 2 indicates the base of a standard motion picture projection machine having the usual reflector 4 and carbons 6 and 8 for forming the arc, the tail flame of which is shown at 10. These carbons are mounted in standard mountings for automatic feed, etc., the details of which are known in the art and form no part of the present invention.

Directly over the tail flame there is mounted a semi-cylindrical member 12 which is mounted in any convenient way, as by rods 14 to the upper part 16 of the projector. The member 12 is provided with a chimney aperture 18 directly over the tail flame of the arc and directly below the regular chimney 20 of the projector; the inside of member 12 is brightly polished, for reflecting light.

Suspended by rods 22 from member 12 is a pair of plates 24, which are placed on either side of the tail flame, in a vertical plane, substantially parallel to the longitudinal axis of the projector. Rods 22 are secured to member 12 by nuts 22', the positioning of which rods and nuts varies the setting of the plates 24. These plates 24 may be of any suitable shape, here shown as substantially square, preferably being made of asbestos and coated with aluminum bronze for increasing their light reflecting power.

Also suspended from member 12, by a rod 26, is a third plate 28, which is also preferably made of asbestos, coated with aluminum bronze, this plate being directly in front of the tail flame. Rod 26 is secured by nut 26' to member 12, by means of which the setting of plate 26 may be varied.

A circular cylindrical member 32, the inside of which is highly polished, is mounted well to the right of the tail flame, the forward end of member 32 fitting into the front portion 36 of the standard projector. Light rays that might otherwise be lost are reflected by the interior polished surface of member 32 into the converging barrel 36' of the projector, toward the film aperture.

Placed just below the flaming arc is a pair of swingable reflectors 40 and 42, the inner surfaces of which are highly polished. These reflectors are shaped substantially like the segment of a cone and slant upwardly, their right vertical edges substantially meeting the left-hand end of the cylindrical member 32.

These reflectors may each be hingedly mounted on a rod 44 secured to member 32 by means of a plate 46. These reflectors 40 and 42 are provided with handles 48 so that they may be swung upwardly about rods 44 for giving access to the carbons of the arc. The interior surfaces of the reflectors 40 and 42 are highly polished for reflecting light rays into the cylindrical member 32.

With the features described, wavering of the arc is prevented by the side plates 24, these plates also, in cooperation with the plate 28, aiding in the reflectors of certain of the light rays into the reflector 4, which reflects them into the member 32. The inside polished surfaces of members 12, 40, and 42 prevent the escape of light rays and reflect them also into member 32.

The foregoing features may be conveniently built into a standard motion picture projector without making any changes in the structure and operation of the projector itself, while the amount of light obtainable from the arc, with a given amount of power, is increased in the neighborhood of 20 or 25%.

Referring to the modification shown in Figs. 7 and 8, corresponding features are indicated by corresponding reference characters. In Figs. 7 and 8, however, the plates 24', corresponding to the plates 24 of Fig. 1, are carried by rods 50, which bend at a right angle and are adjustably mounted in apertured bosses 52, being adjustably held therein by set screws 54.

The other plate 28', corresponding to the plate 28, is supported by a rod 56 which bends at a right angle, the horizontal reach of which is adjustably mounted in an apertured boss 58 by means of a set screw 60.

The above arrangement provides for a more ready adjustment of the plates 24' and 28'. Other features of the apparatus are as shown in connection with Figs. 1 and 2.

While the preferred embodiments of the invention have been illustrated in some detail, it should be understood that the invention is not to be limited to these details, but may be carried out in other ways, as falling within the scope of the claims.

I claim as my invention:

1. Apparatus for increasing the amount of light from a flaming arc, comprising a pair of plates placed on either side of the flaming arc and in planes parallel to the beam of light from the arc, and means for varying the setting of said plates with respect to the arc.

2. Apparatus for increasing the amount of light from a flaming arc, comprising a pair of substantially parallel vertically disposed plates, positioned on either side of the tail flame of the arc and in line with the beam of light therefrom, said plates having bright light reflecting surfaces, and means for varying the setting of said plates with respect to the arc.

3. Apparatus for increasing the amount of light from a flaming arc, comprising a reflector, a pair of substantially parallel plates placed on either side of the flaming arc and parallel to the axis of the reflector, and means for changing the vertical positioning of the plates with respect to the arc.

4. Apparatus for increasing the amount of light from a flaming arc, comprising a reflector, and a pair of substantially parallel, vertically disposed plates, positioned on either side of the tail flame of the arc, in planes parallel to the axis of the reflector, and means for changing the horizontal positioning of the plates with respect to the arc.

5. Apparatus for increasing the amount of light from a flaming arc, comprising a pair of light reflecting plates made of asbestos coated with a metallic powder for reflecting light and placed on either side of the flaming arc and in planes parallel to the beam of light from the arc.

6. Apparatus for increasing the amount of light from a flaming arc, comprising a reflector, and a pair of substantially parallel, vertically disposed light-reflecting plates, made of asbestos coated with a metallic powder for reflecting light and positioned on either side of the tail flame of the arc, in planes parallel to the axis of the reflector, and means for varying the setting of said plates with respect to the arc.

7. Apparatus for increasing the amount of light from a flaming arc, comprising a pair of light-reflecting plates placed on either side of the flaming arc and in planes parallel to the beam of light from the arc and a third light-reflecting plate positioned medially with respect to said pair of plates, and to one side of the arc.

8. Apparatus for increasing the amount of light from a flaming arc, comprising a reflector, a pair of substantially parallel, vertically disposed, light-reflecting plates, positioned on either side of the tail flame of the arc, in planes parallel to the axis of the reflector and a third light reflecting plate positioned in a vertical plane, to one side of the arc, on the side opposite the reflector.

9. Apparatus for increasing the amount of light from a flaming arc, comprising a reflector on one side of the arc, a substantially cylindrical member, the interior of which is bright for reflecting light and both ends of which are open, placed with its axis parallel to the axis of the reflector and on the other side of the arc and outwardly swingable curved reflector means, having an interior surface slanting toward one end of cylindrical member, and positioned below the arc, for directing light toward said cylindrical member.

10. Apparatus for increasing the amount of light from a flaming arc, comprising a reflector to the rear of the arc, a pair of substantially parallel, vertically disposed plates, positioned on either side of the tail flame of the arc, in planes parallel to the axis of the reflector, a semi-cylindrical reflector member positioned over the arc and over said vertically disposed plates and a cylindrical member, the interior of which is polished for reflecting light, positioned in front of the arc, with its axis parallel to the axis of the reflector.

11. Apparatus for increasing the amount of light from a flaming arc, comprising a reflector to the rear of the arc, a pair of substantially parallel, vertically disposed plates, positioned on either side of the tail flame of the arc, in planes parallel to the axis of the reflector, a cylindrical member, the interior of which is polished for reflecting light, positioned in front of the arc, with its axis parallel to the axis of the reflector, and hinged reflector means substantially semi-cylindrical in shape, but having an interior surface inclining toward one end of said cylindrical member, and positioned below the arc, for reflecting light into said cylindrical member.

MICHAEL EDWARD GLEICK.

CERTIFICATE OF CORRECTION.

Patent No. 2,068,795.  January 26, 1937.

MICHAEL EDWARD GLEICK.

It is hereby certified that error appears in the printed specification of the above numbered patent requiring correction as follows: Page 1, first column, line 20, for the word "member" read members; page 2, first column, line 6, for "reflectors" read reflection; and that the said Letters Patent should be read with these corrections therein that the same may conform to the record of the case in the Patent Office.

Signed and sealed this 2nd day of February, A. D. 1937.

(Seal)

Leslie Frazer
Acting Commissioner of Patents.